United States Patent [19]
Toya et al.

[11] Patent Number: 5,142,763
[45] Date of Patent: Sep. 1, 1992

[54] METHOD FOR CONNECTING OPTICAL FIBERS SEALED IN METAL PIPES

[75] Inventors: Shigeo Toya; Yoshiyuki Hiramoto; Koji Sasaki; Koichi Abe; Tatsuo Teraoka; Hirokazu Shiga, all of Ibaraki; Yasunori Yoshie, Tokyo, all of Japan

[73] Assignees: Hitachi Cable, Ltd.; NKK Corporation, both of Tokyo, Japan

[21] Appl. No.: 672,966

[22] Filed: Mar. 31, 1991

Related U.S. Application Data

[62] Division of Ser. No. 587,952, Sep. 25, 1990, Pat. No. 5,076,657.

[51] Int. Cl.$^5$ .................... B21D 39/04; H01R 43/02; G02B 6/38
[52] U.S. Cl. ........................ 29/517; 29/868; 29/869; 385/99
[58] Field of Search .............. 29/514–518, 29/869, 873, 868; 350/96.2, 96.21, 96.22, 96.23, 96.34

[56] References Cited

U.S. PATENT DOCUMENTS

| | | | |
|---|---|---|---|
| 4,580,874 | 4/1986 | Winter et al. | 350/96.21 |
| 4,708,433 | 11/1987 | Kakii et al. | 350/96.21 X |
| 4,810,054 | 3/1989 | Shinbori et al. | 350/96.34 X |
| 5,000,537 | 3/1991 | Saito et al. | 350/96.21 X |

*Primary Examiner*—Joseph M. Gorski
*Assistant Examiner*—Peter Dungba Vo
*Attorney, Agent, or Firm*—Helfgott & Karas

[57] ABSTRACT

Metal pipes containing optical fibers are connected to each other directly or indirectly by use of a sleeve. In case of using the sleeve, the sleeve is connected at one end to one of the metal pipes, after the optical fibers are connected. Then, the sleeve is elongated by a predetermined length, so that the sleeve is connected at the other end to the other metal pipe. Consequently, no tensile stress resides in the connected optical fibers in the connected structure. When the metal pipes are connected directly to each other, one or both of the metal pipes are elongated, after the optical fibers are connected. Then, the metal pipes are connected by use of the elongated portions. Consequently, the same result is obtained as using the sleeve.

7 Claims, 9 Drawing Sheets

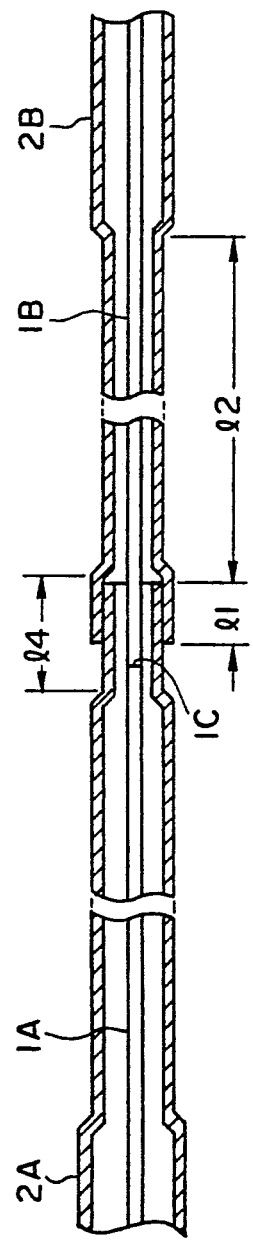
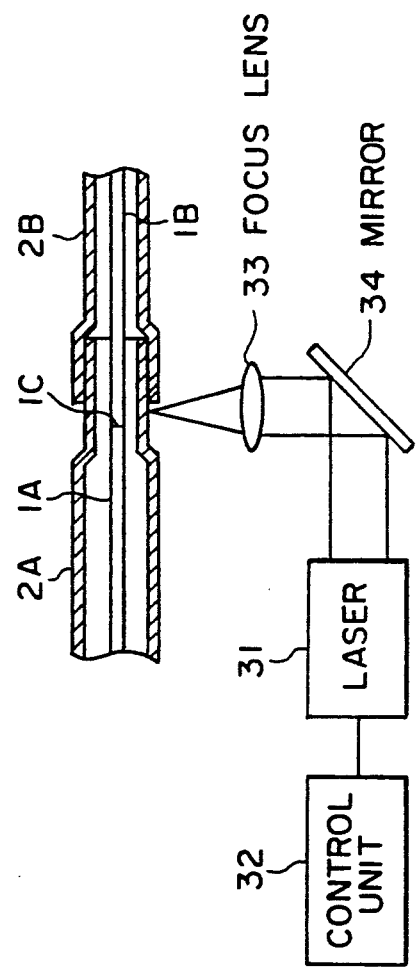

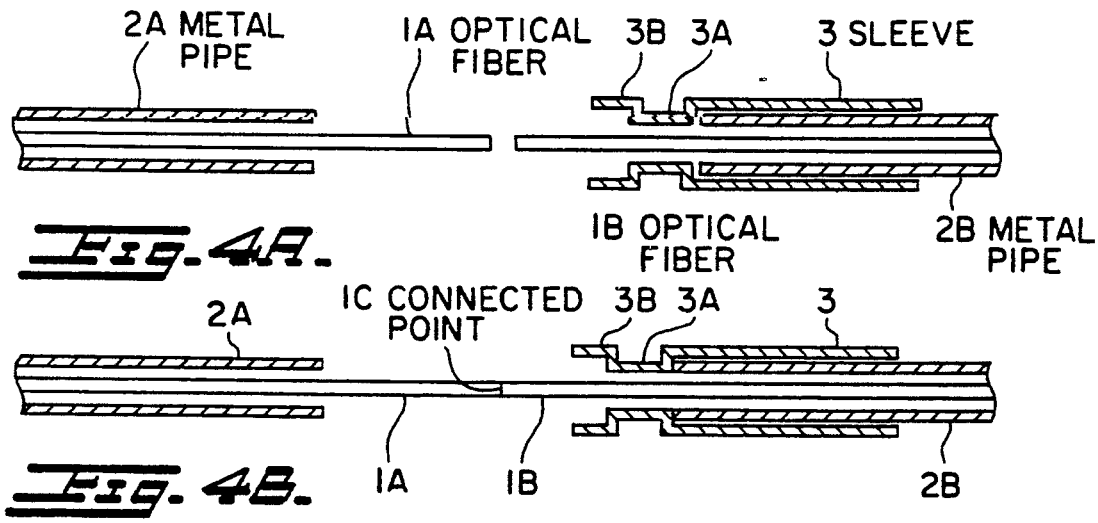
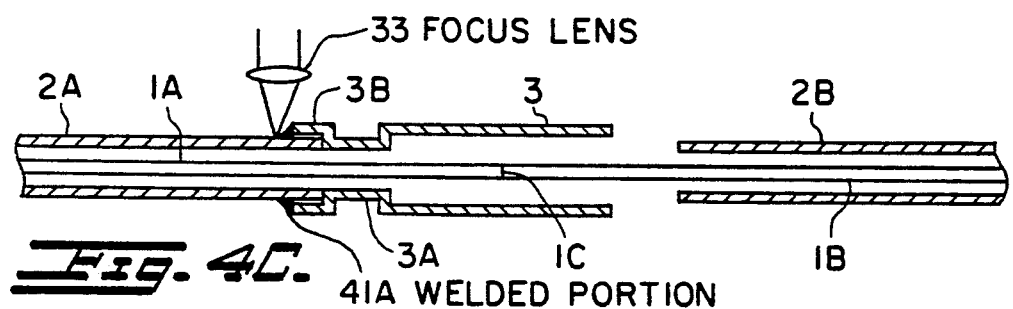
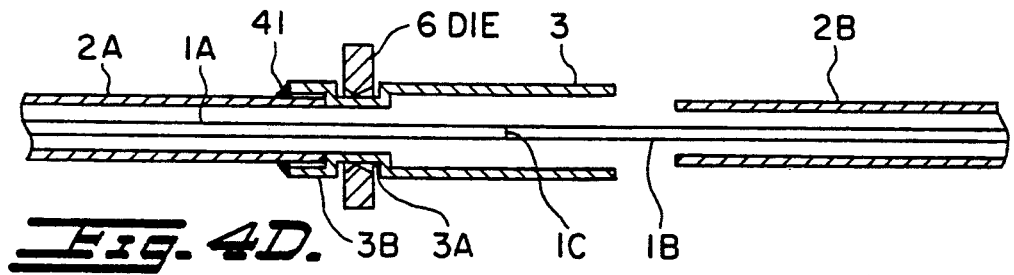
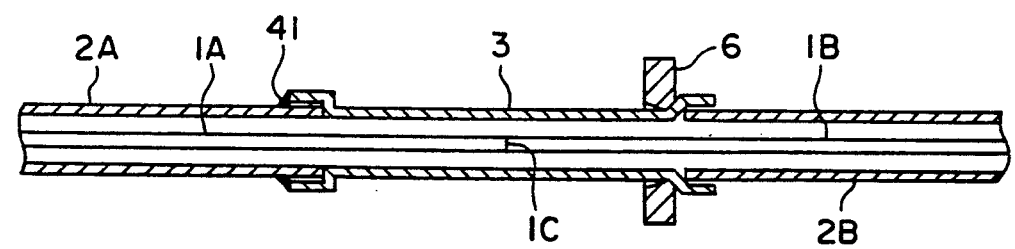
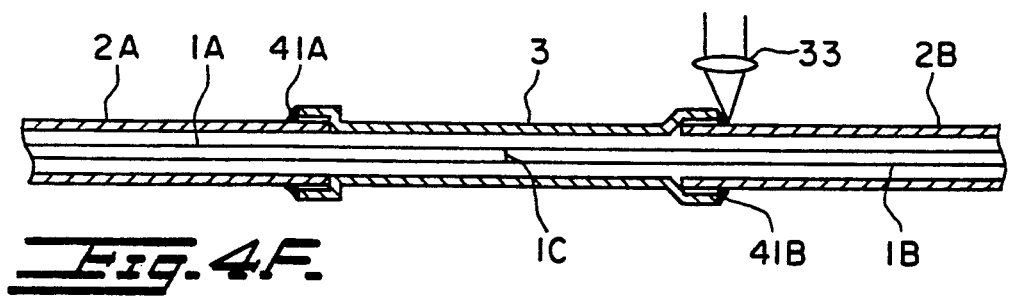

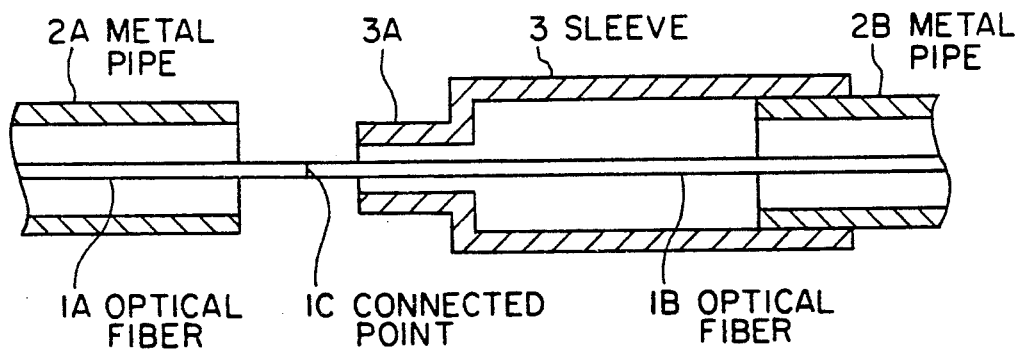
_Fig. 6A._
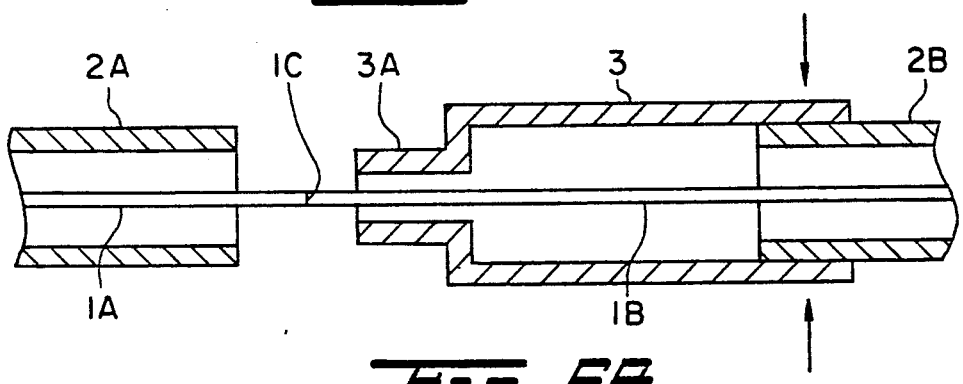
_Fig. 6B._
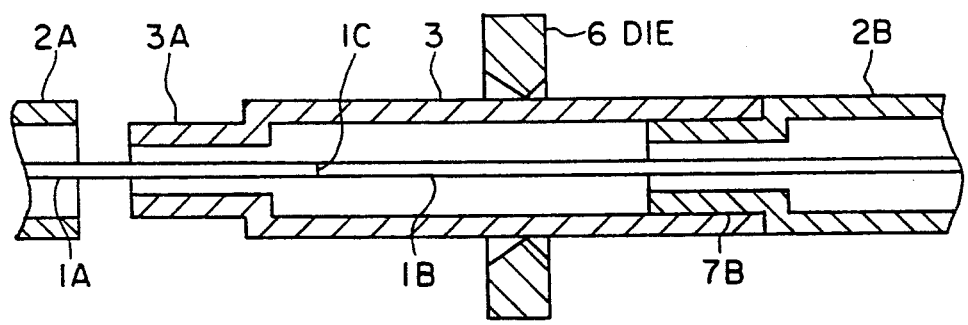
_Fig. 6C._
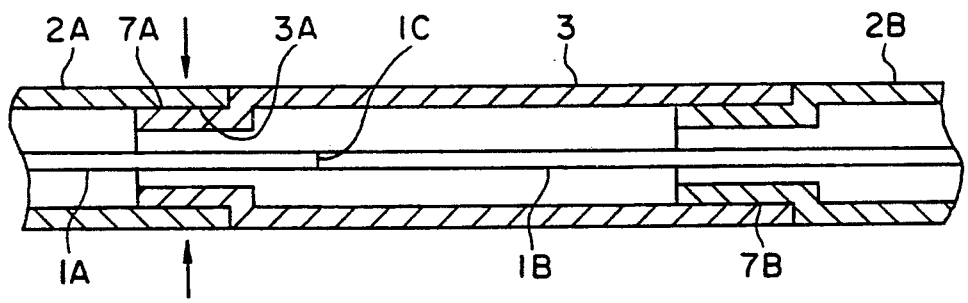
_Fig. 6D._

METHOD FOR CONNECTING OPTICAL FIBERS SEALED IN METAL PIPES

CROSS REFERENCE TO RELATED APPLICATION

This is a division of application Ser. No. 587,952, filed Sep. 25, 1990, now U.S. Pat. No. 5,076,657.

FIELD OF THE INVENTION

This invention relates to a connection structure of optical fibers sealed in metal pipes, and a method for connecting optical fibers sealed in metal pipes, and more particularly to, an optical fiber connecting structure and a method for the structure, in which no tensile stress is applied to and resides in the optical fibers to avoid the deterioration of transmission characteristics of the optical fibers.

BACKGROUND OF THE INVENTION

In case where an optical fiber is applied to a submarine cable, the optical fiber is contained in a metal pipe of, for instance, stainless steel, so that the optical fiber is mechanically reinforced, and is sealed to have a water and gas-proof property. The optical fiber thus sealed in the metal pipe is stranded with cores of a power or communication cable to provide a submarine cable. Submarine cables are manufactured by a length of several km. Therefore, a predetermined number of the submarine cables must be connected to each other to provide a predetermined length of a submarine cable crossing a channel, etc. by an outer predetermined number of joints. In this case, an outer diameter of the joints of the connected submarine cable is designed to be equal to that of the remaining portions of the connected submarine cable. In the same manner, metal pipes containing optical fibers are connected to each other to be accommodated in the connected submarine cable, such that an outer diameter of connected portions of the metal pipes is equal to that of the remaining portions of the metal pipes. In this submarine cable, an optical fiber sealed in a metal pipe may be replaced by stranded optical fibers, etc.

Otherwise, an optical fiber is also applied to an underwater probing cable in the form of being contained in a metal pipe in the same manner as explained in the above submarine cable. Even in this use, metal pipes containing optical fibers are connected to each other to have the same diameter at connected portions thereof as that of the remaining portions of the metal pipes. This means that no joint box is used to connect the metal pipe-sealed optical fibers to each other.

In this point, a conventional method for connecting optical fibers sealed in metal pipes will be explained.

At first, each of metal pipes containing optical fibers to be connected is removed at a connecting end by a predetermined length which is, for instance, 50 cm. Then, a sleeve is applied over one of the metal pipes, and the optical fibers are fused to be connected to each other. Then, the sleeve is moved to be positioned over the connected optical fibers, so that the sleeve crosses both removed ends of the metal pipes. In this stage, the sleeve is soldered to the metal pipe ends by means of, for instance, a gas burner. Finally, the soldered sleeve is reduced in outer diameter to be equal to the metal pipes by use of a two-split die. In this diameter reduction of the sleeve, it is elongated by 10 percents, that is, 10 cm in a sleeve of 1 m, so that the connected optical fibers are forced to be pulled in the axial direction in compliance with the elongation of the sleeve, under the state that the optical fibers are not fixed in the metal pipes. Thus, the braking of the connected optical fibers is avoided.

However, the conventional method for connecting optical fibers sealed in metal pipes has a disadvantage in that tensile stress resides in the connected optical fibers, because the surplus length of the optical fibers is approximately 0.05 percents in the metal pipes. In more detail, a length l of the optical fibers which is necessary to be pulled in the axial direction, thereby absorbing the elongation of the sleeve is calculated in the below equation.

$$l = 10 \; cm \times 100/0.05 \times \tfrac{1}{2} = 100 \; m$$

This means that the optical fibers are required to be pulled in the axial direction along the length of 100 m on the both sides of the joint, respectively. Practically, this is impossible to be realized, so that the aforementioned residual tensile stress occurs in the connected optical fibers. As a result, the mechanical strength of the optical fibers is deteriorated, especially, with secular variation under water, and the transmission loss is increased, especially, with secular variation induced by the absorption of hydrogen.

The conventional method for connecting optical fibers sealed in metal pipes has another disadvantage in that a breaking strength of the optical fibers is lowered from 6 kg to 1 kg due to the carbonization of polyurethane layers coating cores of the optical fibers, because the layers are heated at the soldering stage by the gas burner.

SUMMARY OF THE INVENTION

Accordingly, it is an object of this invention to provide a connection structure of optical fibers sealed in metal pipes, in which tensile stress does not resides in connected optical fibers and to provide a method for the connection structure.

It is a further object of this invention to provide a connection structure of optical fibers sealed in metal pipes, in which the mechanical strength of connected optical fibers is not deteriorated, and to provide a method for the connection structure.

It is a still further object of this invention to provide a connection structure of optical fibers sealed in metal pipes, in which secular variation increasing the transmission loss does not occur, and to provide a method for the connection structure.

It is a yet still further object of this invention to provide a connection structure of optical fibers sealed in metal pipes, in which a breaking strength of connected optical fibers is not lowered, and to provide a method for the connected structure.

According to a feature of the invention, a connection structure of optical fibers sealed in metal pipes, comprises:

a sleeve connected at both ends thereof to respective ends of the metal pipes; and connected optical fibers sealed in the sleeve;

wherein one of inner and outer diameters of the sleeve is equal to a corresponding one of inner and outer diameters of the metal pipes, and no tensile stress resides in the connected optical fibers.

According to the other feature of the invention, a method for connecting optical fibers sealed in metal pipes, comprises the steps of:

connecting the optical fibers exposed from the metal pipes to each other to provide connected optical fibers;

connecting a sleeve to one of the metal pipes at one end of the sleeve, the sleeve being positioned over the one of the metal pipes at least partially before connecting the optical fibers;

reducing an outer diameter of the sleeve to elongate the sleeve by a predetermined length, so that the sleeve is overlapped on a remaining one of the metal pipes; and connecting the sleeve to the remaining one of the metal pipes at a remaining end of the sleeve.

BRIEF DESCRIPTION OF THE DRAWINGS

This invention will be explained in more detail in conjunction with appended drawings, wherein:

FIGS. 3A to 3D are cross-sectional views showing a method for connecting optical fibers sealed in metal pipes in a second preferred embodiment according to the invention;

FIGS. 4A to 4F are cross-sectional views showing a method for connecting optical fibers sealed in metal pipes in a third preferred embodiment according to the invention;

FIGS. 5A to 5D are cross-sectional views showing a method for connecting optical fibers sealed in metal pipes in a fourth preferred embodiment according to the invention;

DESCRIPTION OF THE PREFERRED EMBODIMENTS

Before explaining a method for connecting optical fibers sealed in metal pipes in the first preferred embodiment according to the invention, the conventional method for connecting optical fibers sealed in metal pipes will be explained in FIGS. 1A to 1D.

Figure 1A:
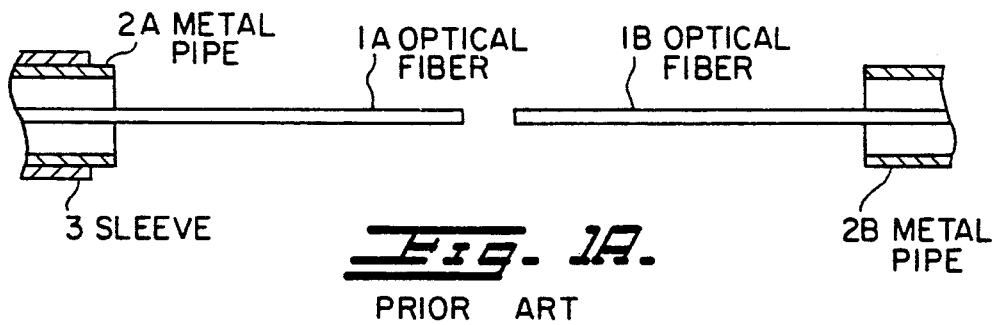
FIGS. 1A to 1C are cross-sectional views showing a conventional method for connecting optical fibers sealed in metal pipes.

In FIG. 1A, two metal pipes 2A and 2B containing optical fibers 1A and 1B are removed at connecting ends by 50 cm, respectively, so that the optical fibers 1A and 1B are exposed by 50 cm, respectively. In this method, the metal pipes 2A and 2B are made of stainless steel, and of 1 mm in outer diameter, and 0.1 mm in thickness to provide characteristics of light weight and large mechanical strength against an outer pressure for withstanding hydrostatic pressure of, for instance, 1000 kg/cm$^2$, and the optical fibers 1A and 1B are of approximately 0.3 mm in outer diameter. Then, a sleeve 3 having a length slightly larger than 1 m is positioned over the metal pipe 2A.

Figure 1B:
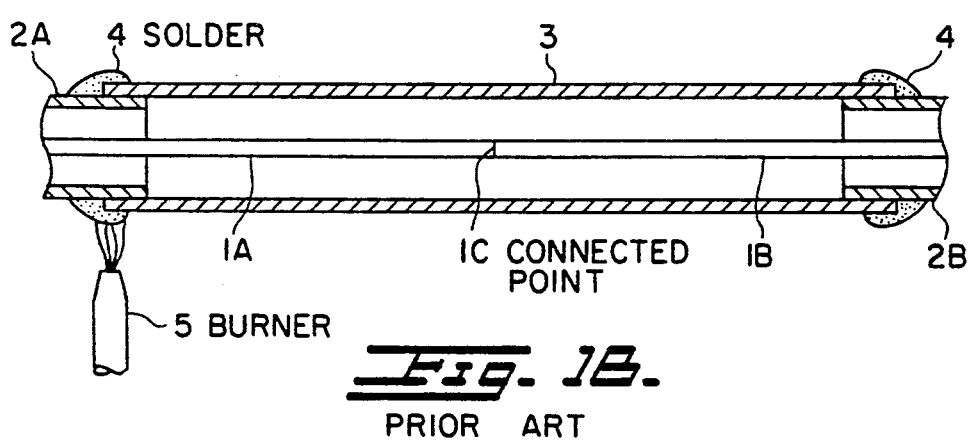

In FIG. 1B, the optical fibers 1A and 1B are connected at a connected point 1C by being fused at tips thereof. Then, the sleeve 3 is moved in the direction of the connected optical fibers, so that the connected optical fibers 1A and 1B are surrounded by the sleeve 3. Thereafter, paste-included solder 4 is applied on respective overlapped portions of the metal pipes 2A and 2B and the sleeve 3, and is heated by a gas burner 5. Thus, the sleeve 3 is connected at the both ends to the metal pipes 2A and 2B. In this case, the solder 4 is penetrated into a gap between the sleeve 3 and a corresponding one of the metal pipes 2A and 2B. When the penetrated length of the solder 4 is approximately 5 mm, a connected strength of the soldered portions is obtained to be approximately equal to that of the remaining portions of the metal pipes 2A and 2B by metallurgical bonding therebetween.

Figure 1C:
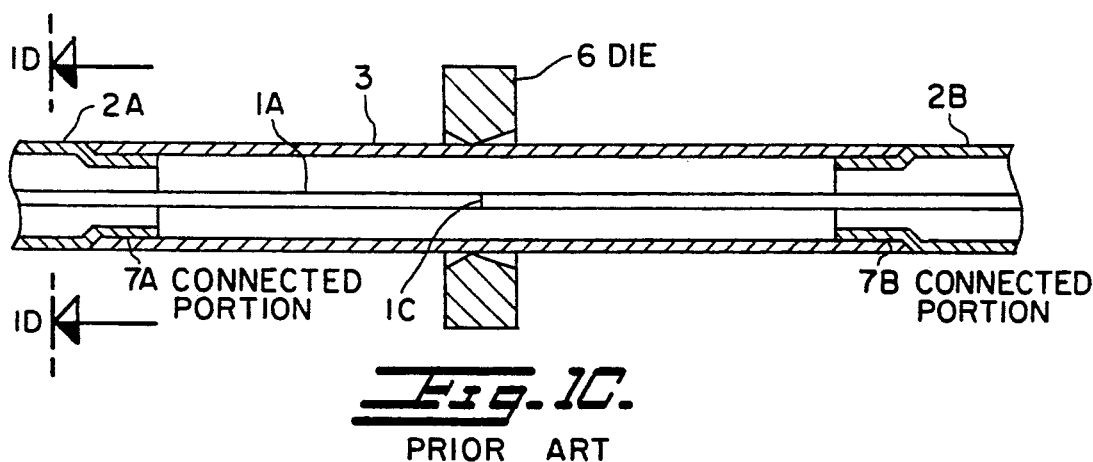

In FIG. 1C, a two-split die is applied over the metal pipe 2A, and is slid over the soldered sleeve 3 to reach the metal pipe 2B by a predetermined pulling force. In practical, four kinds of two-split dies 6 having different reduction sizes are used in the order of the largest size to the smallest size to reduce the diameter of the sleeve 3 including connected portions 7A and 7B by four steps. The sleeve 3 may be welded to the metal pipes 2A and 2B in place of using solder.

Figure 1D:
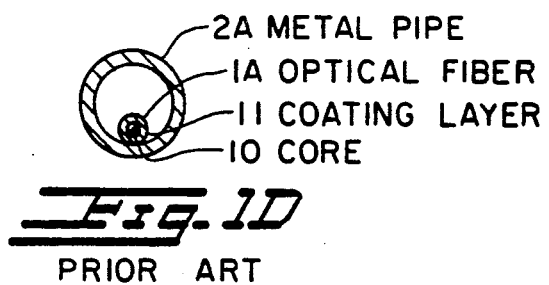
FIG. 1D is a cross-sectional view cut along a line D—D in FIG. 1C.

In FIG. 1D, a cross-section of the optical fiber 1A including a core 10 and a plastic coating layer 11 and the metal pipe 2A which is cut along the line D—D in FIG. 1C is shown.

In this connection structure, the aforementioned disadvantage occurs, in case where the sleeve 3 is reduced in diameter to provide the elongation of 10 percents, because an elongation of an optical fiber is approximately 5 to 6 percents at the maximum, although this is not explained here again.

A method for connecting optical fibers sealed in metal pipes in the first preferred embodiment according to the invention will be explained in FIGS. 2A to 2E.

Figure 2A:
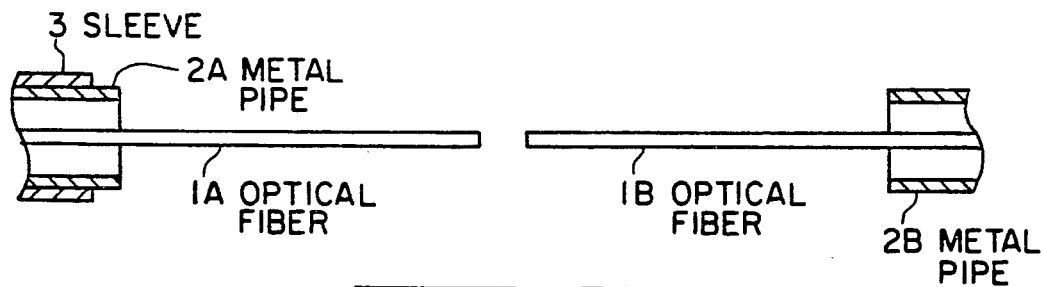
FIGS. 2A to 2E are cross-sectional views showing a method for connecting optical fibers sealed in metal pipes in a first preferred embodiment according to the invention.

In FIG. 2A, optical fibers 1A and 1B both having an outer diameter of 0.25 mm are contained in metal pipes 2A and 2B both having an outer diameter of 0.8 mm and an inner diameter of 0.6 mm. The metal pipes 2A and 2B are removed at connecting ends by 50 cm, respectively, so that the optical fibers 1A and 1B are exposed at connecting ends by 50 cm, respectively. A sleeve 3 of SUS stainless steel having a length of 94 cm, an outer diameter of 1.1 mm and an inner diameter of 0.9 mm is positioned over the metal pipe 2A.

Figure 2B:
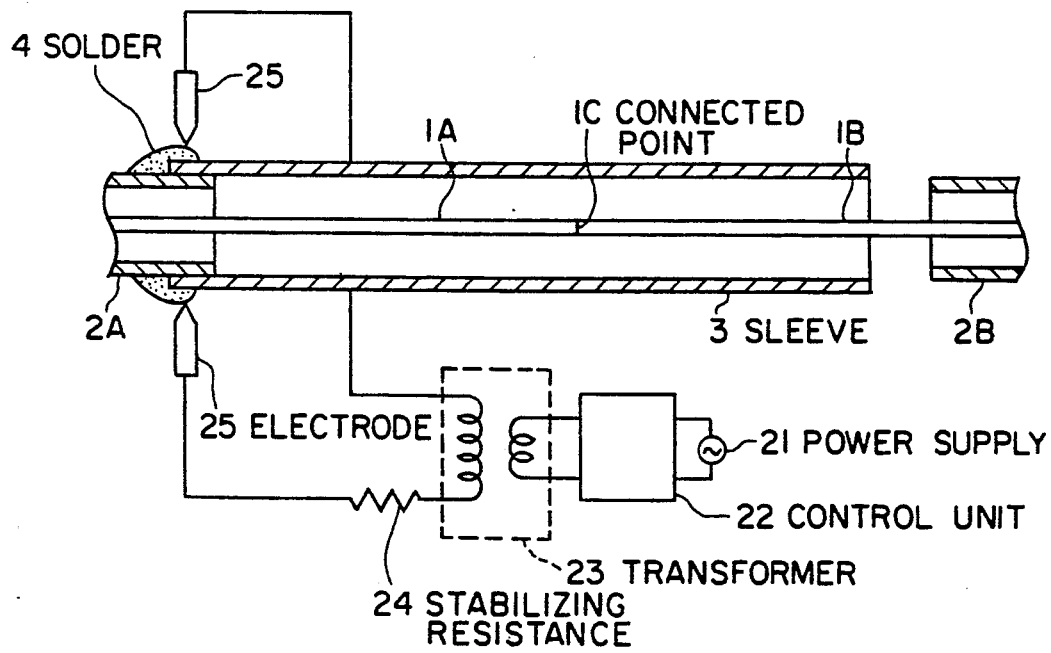

In FIG. 2B, the optical fibers 1A and 1B are fused to be connected at a connected point 1C. Then, the sleeve 3 is moved to be positioned over the connected optical fibers 1A and 1B, so that the sleeve 3 is overlapped at the end of the metal pipe 2A by 2 cm. Thereafter, paste-included solder 4 including Sn of 50 weight %, Pb of 50 weight % and flux which is exclusively used for stainless steel is applied to the overlapped portion, and a pair of electrodes 25 are positioned therearound to heat the solder 4 and the overlapped portion. The electrodes 25 are connected through a stabilizing resistance 24 to a transformer 23 which is controlled by a control unit 22. This control unit 22 controls the electrodes 25 to carry out discharge of a predetermined duration, for instance, of 0.2 sec. around the solder 4 applied to the overlapped portion in accordance with an AC voltage of a power supply 21 by six times. As a result, molten solder is penetrated into a gap of the overlapped portion between the metal pipe 2A and the sleeve 3 by approximately 5 mm. Thus, the sleeve 3 is firmly connected to the metal pipe 2A at the end thereof.

Figure 2C:
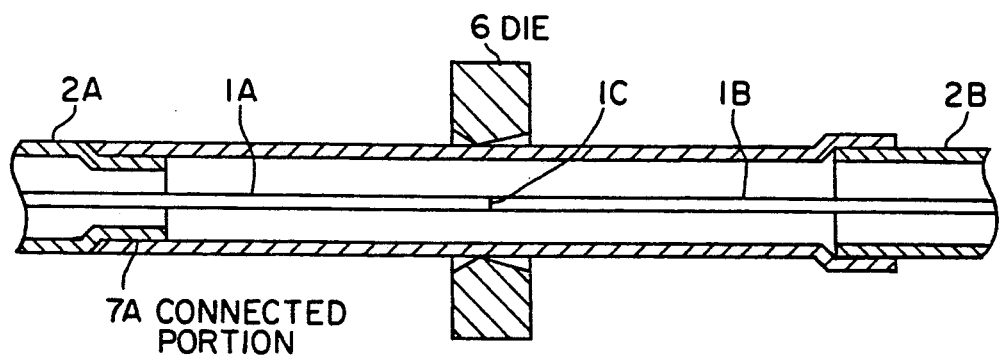

In FIG. 2C, a two-split die 6 is applied over the metal pipe 2A, and is slid over the overlapped portion and the sleeve 3 except for a free end of the sleeve 3 having a length of approximately 2 cm, so that an elongation of the sleeve 3 is obtained due to the diameter reduction by 10 percents. Consequently, the free end of the sleeve 3 overlaps over the end of metal pipe 2B, as clearly illustrated therein. For this purpose, four two-split dies having different reduction sizes are practically used.

Figure 2D:
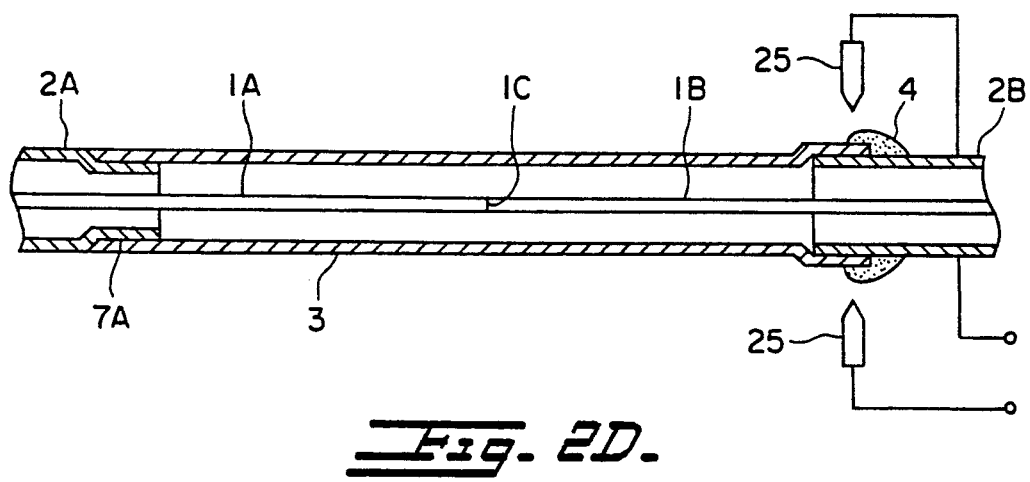
Figure 2E:
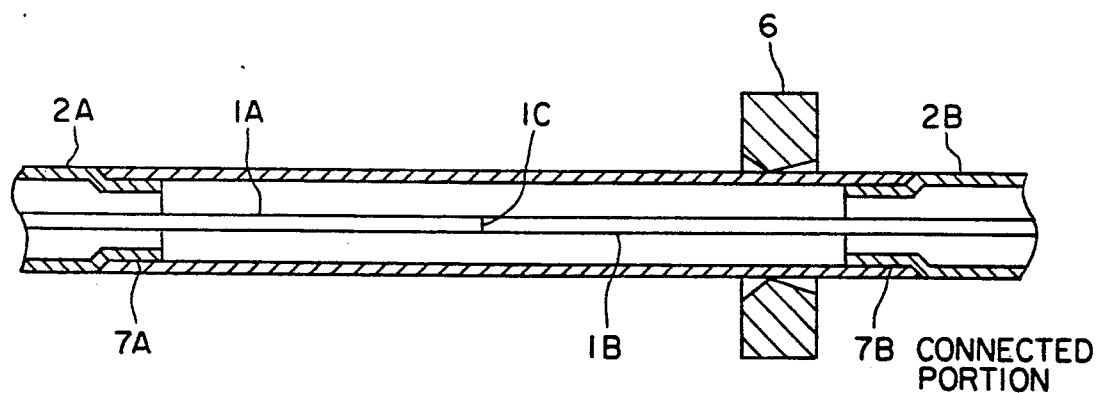

In FIG. 2D, solder 4 of the aforementioned type is applied to the overlapped portion of the sleeve 3 and the metal pipe 2B, and is heated by the electrodes 25 in the same manner as at the overlapped portion of the sleeve 3 and the metal pipe 2A. Thus, the opposite end of the sleeve 3 is firmly connected to the end of the metal pipe 2B. Then, the two-split die 6 is applied to the latter overlapped portion which is thereby reduced in diameter along with the remaining portion of the sleeve 3 called formerly "free end". Consequently, a connection structure of the optical fibers 1A and 1B sealed in the metal pipes 2A and 2B are finally obtained as illustrated in FIG. 2E. In this connection structure, a mechanical strength of 22 kgf which is the same value as in the remaining portions of the metal pipes 2A and 2B is obtained. In addition, the deterioration of coating layers and cores of the optical fibers 1A and 1B which is caused due to the increase of temperature in the conventional method is never found in this preferred embodiment, because the electrodes 25 discharges by a predetermined duration of, for instance, 0.6 sec. Considering tensile stress of the optical fibers 1A and 1B, the optical fibers 1A and 1B are affected only by the elongation of the latter overlapped portion and the so called free end portion of the sleeve 3. This elongation l is calculated in the below equation, when it is assumed that the elongation of the sleeve 3 is ten percents.

$$l = 20 \times 0.1 = 2 \text{ mm}$$

This length l is equivalent to a percentage elongation p as calculated below, when a length of this joint is 1 m $$p = 2/1000 = 0.2\%$$

This percentage elongation can be negligible, because an optical fiber can be ordinarily elongated by 5 to 6 percents.

A method for connecting optical fibers sealed in metal pipes in the second preferred embodiment according to the invention will be explained in FIGS. 3A to 3D.

Figure 3A:
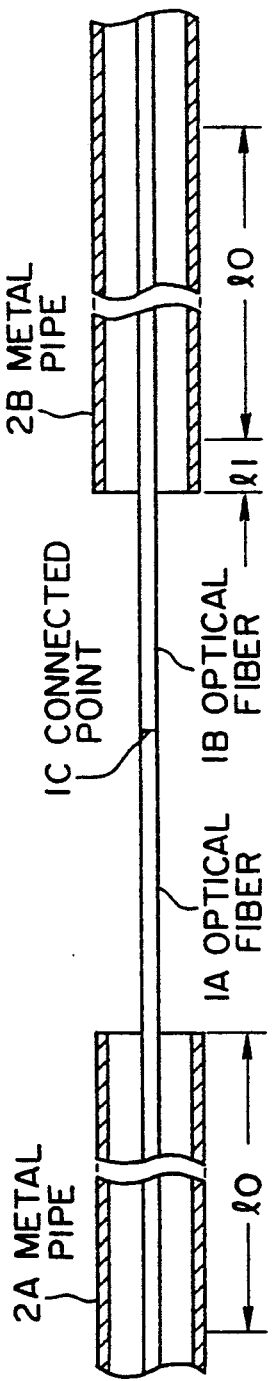

In FIG. 3A, metal pipes 2A and 2B containing optical fibers 1A and 1B are removed at connecting ends by approximately 50 cm as explained in the first preferred embodiment. Outer and inner diameters of the metal pipes 2A and 2B, and an outer diameter of the optical fibers 1A and 1B are the same as those in the first preferred embodiment. Then, the optical fibers 1A and 1B are fused to be connected to each other at a connected point 1C. Thereafter, two-split dies (not shown) are applied over the metal pipes 2A and 2B, respectively, to provide the elongation thereof along a distance of, for instance, 12.5 m indicated by the letter $l_0$.

Figure 3B:
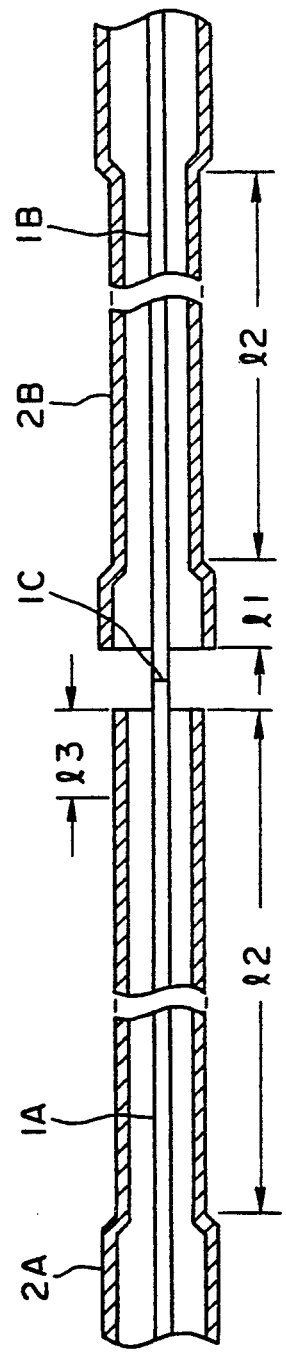

In FIG. 3B, the portions of the metal pipes 2A and 2B corresponding to the distance $l_0$ are reduced in diameter to provide the elongation of 0.5 m corresponding to that of 4 percents. In this case, the outer diameter of the metal pipes 2A and 2B is reduced to be 0.7 mm, while a portion of the metal pipe 2B indicated by the letter $l_1$ equal to 2 cm is not reduced in outer diameter to maintain an inner diameter of 0.6 mm. In addition, a two-split die (not shown) is applied over the metal pipe 2A to reduce the outer diameter thereof along a distance of, for instance, 10 cm indicated by the letter $l_3$.

In FIG. 3C, this portion of the metal pipe 2A indicated by the letter $l_3$ is reduced to be 0.58 mm in outer diameter to be inserted into the non-reduced end $l_1$ of the metal pipe 2B as indicated by the letter $l_4$.

In FIG. 3D, laser light beam is irradiated to the overlapped portion of the metal pipes 2A and 2B which is provided in FIG. 3C. The laser light beam is emitted from a laser device 31 of, for instance, YAG laser having a power of 250 W which is controlled by a control unit 32, and reflected by a mirror 34 and focused on the overlapped portion by a focus lens 33. Spot welding is repeatedly carried out on an overall periphery of the overlapped portion under the condition that a pulse width is 2 msec, a pulse interval is approximately 5 sec, and the number of irradiating the laser light beam pulses is twenty. These are controlled by the control unit 32.

In a structure thus connected in the second preferred embodiment, a mechanical strength of 22 kgf which is the same strength value as in the remaining portions of the metal pipes 2A and 2B is obtained, and the deterioration of coating layers and cores of the optical fibers 1A and 1B is not found, because the laser light beam is irradiated to the overlapped portion of the metal pipes 2A and 2B with the pulse interval of 5 sec.

A method for connecting optical fibers sealed in metal pipes in the third preferred embodiment according to the invention will be explained in FIGS. 4A to 4F.

In FIG. 4A, metal pipes 2A and 2B of SUS 404 stainless steel having an outer diameter of 0.9 mm and an inner diameter of 0.7 mm contains optical fibers 1A and 1B having a outer coating layer of ultraviolet curing resin, an outer diameter of which is 0.4 mm. Simultaneously, a sleeve 3 of SUS 304 stainless steel having an outer diameter of 1.2 mm and an inner diameter of 1.0 mm, and a length of 900 mm is prepared. This sleeve 3 is provided with a diameter-reduced portion 3A of 25 mm in length having an outer diameter of 0.9 mm and an inner diameter of 0.7 mm which is successive to an end portion 3B of 25 mm in length.

At first, the metal pipes 2A and 2B are removed at connecting ends to expose the optical fibers 1A and 1B, respectively, by 650 mm, and the sleeve 3 is positioned over the metal pipe 2B, such that the diameter-reduced portion 3A is in contact with the end of the metal pipe 2B.

In FIG. 4B, the optical fibers 1A and 1B are fused to be connected at a connected point 1C, and the connected portion of the optical fibers 1A and 1B is coated with ultraviolet curving resin. In the connected optical fibers 1A and 1B, a connected mechanical strength of 2 kgf is obtained in a proof test. The proof test is easily carried out in this connected portion, because the optical fibers 1A and 1B are exposed from the removed ends of the metal pipes 2A and 2B by 650 mm which is more than a required length of 500 mm.

In FIG. 4C, the sleeve 3 is moved toward the metal pipe 2B, so that the diameter-reduced portion 3A of the sleeve 3 is in contact with the end of the metal pipe 2A, and the end portion 3B of the sleeve 3 is overlapped over the metal pipe 2A. Then, laser light beam pulse which is emitted from a YAG laser device (not shown) to be focused by a focus lens 33 is irradiated on the overlapped portion of the sleeve end portion 3B and the metal pipe 2A by predetermined pulse width and interval. As clearly illustrated therein, the laser light beam pulse is directed to the very end of the sleeve end portion 3B, so that the sleeve 3 is welded to the metal pipe 2A at the overlapped portion. At this welding stage, the laser light beam pulse is rotated around the overlapped portion by 1 rpm, a laser power is 0.4 J, a pulse interval is 2 sec, and a defocused length of the laser light beam pulse is 4 mm. Under this welding condition, a maximum temperature in the interior of the overlapped portion of the metal pipe 2A and the sleeve 3 is 120° C. Therefore, coating layers and cores of the optical fibers 1A and 1B are not deteriorated.

In FIG. 4D, a two-split die 6 is applied over the diameter reduced portion 3A of the sleeve 3, and is slid over the sleeve 3 in the direction of the free end thereof.

In FIG. 4E, the sleeve 3 is reduced in outer diameter except for a free end thereof as a result of sliding the two-split die 6 thereover. At this diameter reduction stage, six kinds of two-split dies having different reduction sizes of 1.15 mm, 1.10 mm, 1.05 mm, 1.00 mm, 0.95 mm and 0.90 mm are used. Therefore, the sleeve 3 is reduced in outer diameter in a step manner. At this time, a maximum force which is required to slide the two-split die over the sleeve 3 is 8 kg, so that no elongation is found in the metal pipe 2A and the welded portion of the metal pipe 2A and the sleeve 3. The sleeve 3 is elongated by 40 percents, so that the non-reduced free end of the sleeve 3 reaches the end of the metal pipe 2B to provide an overlapped portion of the metal pipe 2B and the sleeve 3.

In FIG. 4F, this overlapped portion is welded in the same condition as at the former overlapped portion by laser light beam pulse which is focused by the focus lens 33.

Consequently, a connection structure for connecting the optical fibers 1A and 1B sealed in the metal pipes 2A and 2B is obtained. As shown in FIG. 4F, this connection structure has the same inner diameter along the entire length thereof. For this structure, no increase of transmission loss induced by small bending of the optical fibers 1A and 1B occurs, because the optical fibers 1A and 1B does not receive any interference in moving in the metal pipes 1A and 1B.

A method for connecting optical fibers sealed in metal pipes in the fourth preferred embodiment according to the invention will be explained in FIGS. 5A to 5D, wherein like parts are indicated by like reference numerals as used in the first to third preferred embodiments, so that explanations are not repeated here.

In FIG. 5A, a sleeve 3 having a diameter-reduced portion 3A is positioned over a metal pipe 2B, before optical fibers 1A and 1B are connected at a connected point 1C.

In FIG. 5B, the diameter-reduced portion 3a of the sleeve 3 is inserted into a metal pipe 2A to provide an overlapped portion of the metal pipe 2A and the sleeve 3. The overlapped portion is soldered or welded by an appropriate means as indicated by arrows.

In FIG. 5C, a two-split die 6 is applied over the metal pipe 2A, and is slid over the sleeve 3 which is thereby reduced in outer diameter except for an overlapped portion of the metal pipe 2B and the sleeve 3. Then, the latter overlapped portion is soldered or welded as indicated by arrows.

In FIG. 5D, the latter overlapped portion thus soldered or welded is reduced in outer diameter by means of a two-split die 6. Consequently, a connection structure of the optical fibers 1A and 1B sealed in the metal pipes 2A and 2B having metal pipe connected portions 7A and 7B is obtained.

A method for connecting optical fibers sealed in metal pipes in the fifth preferred embodiment according to the invention will be explained in FIGS. 6A to 6D, wherein like parts are indicated by like reference numerals as used in the first to fourth preferred embodiments, so that explanation is not repeated here.

Figure 6A:
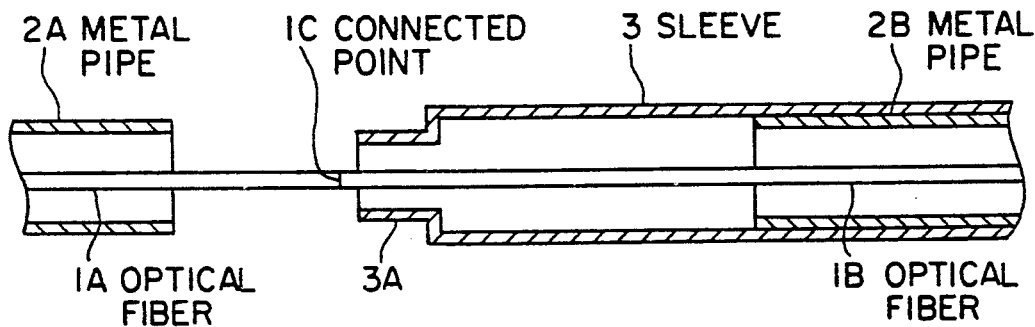
FIGS. 6A to 6D are cross-sectional views showing a method for connecting optical fibers sealed in metal pipes in a fifth preferred embodiment according to the invention.

In FIG. 6A, a sleeve 3 having a diameter-reduced portion 3A is positioned over a metal pipe 2B, before optical fibers 1A and 1B are connected at a connected point 1C.

Figure 6B:
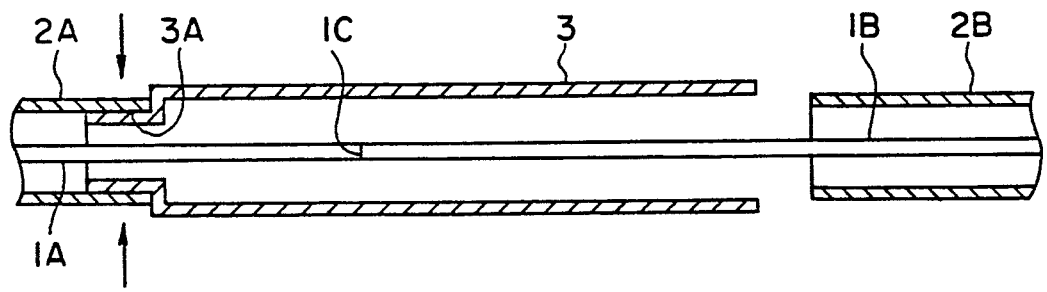

In FIG. 6B, an overlapped portion of the metal pipe 2B and the sleeve 3 is soldered or welded as indicated by arrows.

Figure 6C:
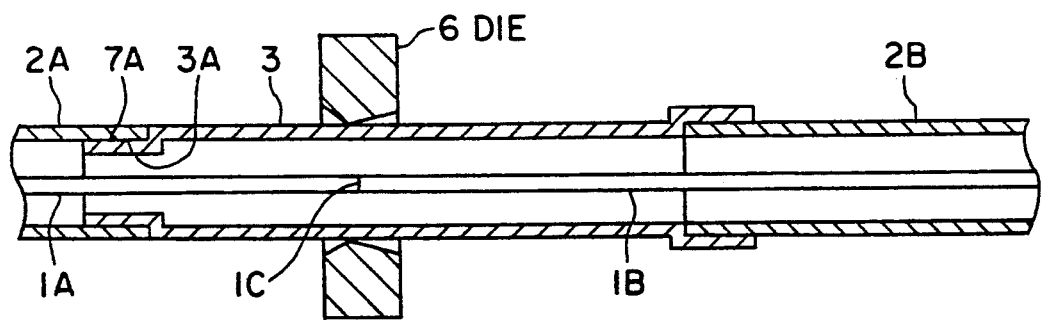

In FIG. 6C, a two-split die 6 is applied over the metal pipe 2B, and is slid over the sleeve 3 to reduce the overlapped portion and the sleeve 3 in diameter.

Figure 6D:
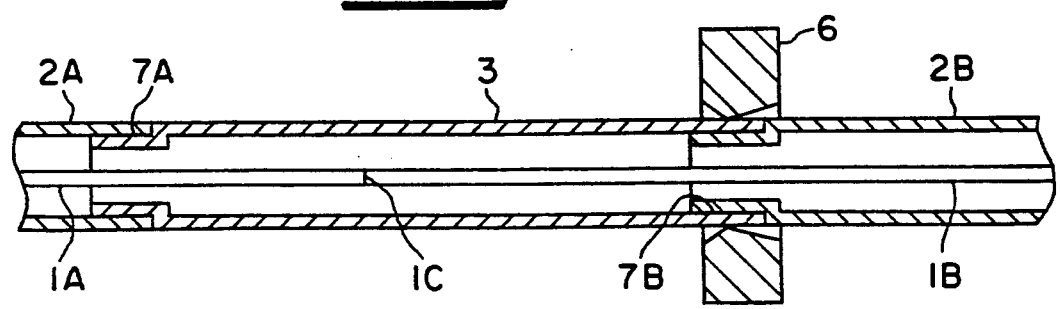

In FIG. 6D, the diameter-reduced portion 3A of the sleeve 3 is inserted into a metal pipe 2A, and an overlapped portion of the metal pipe 2A and the sleeve 3 is soldered or welded as indicated by arrows.

Consequently, a connection structure of the optical fibers 1A and 1C sealed in the metal pipes 2A and 2B having metal pipe connected portions 7A and 7B is obtained.

A method for connecting optical fibers sealed in metal pipes in the sixth preferred embodiment according to the invention will be explained in FIGS. 7A to 7E, wherein like parts are indicated by like reference numerals as used in the first to fifth preferred embodiments, so that explanation is not repeated here.

Figure 7A:
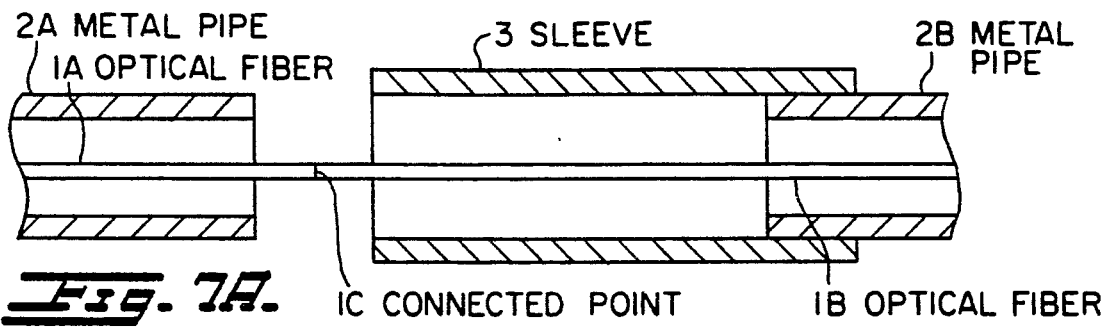
FIGS. 7A to 7E are cross-sectional views showing a method for connecting optical fibers sealed in metal pipes in a sixth preferred embodiment according to the invention.

In FIG. 7A, a sleeve 3 is positioned over a metal pipe 2B, before optical fibers 1A and 1B are connected at a connected point 1C.

Figure 7B:
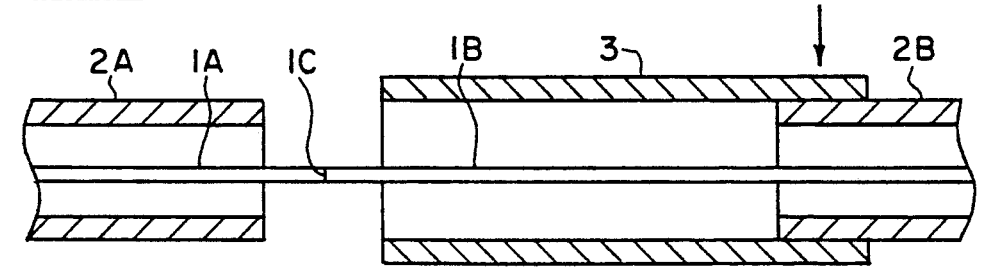

In FIG. 7B, an overlapped portion of the metal pipe 2B and the sleeve 3 is soldered or welded as indicated by arrows.

Figure 7C:
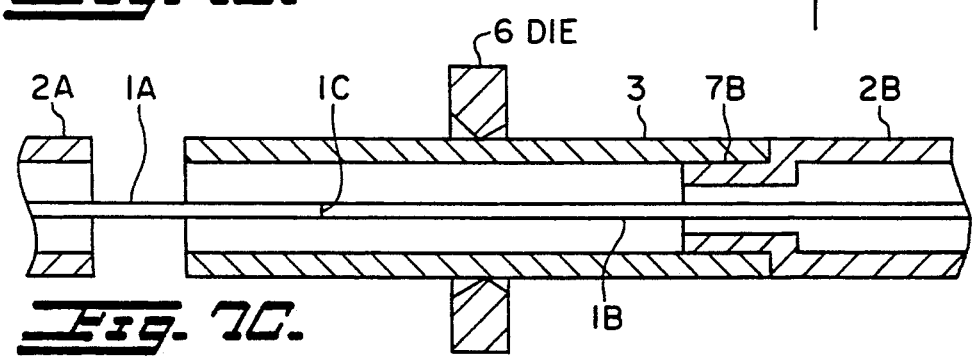

In FIG. 7C, a two-split die 6 is applied over the metal pipe 2B, and is slid over the sleeve 3 to reduce an outer diameter of the soldered or welded portion and the sleeve 3.

Figure 7D:
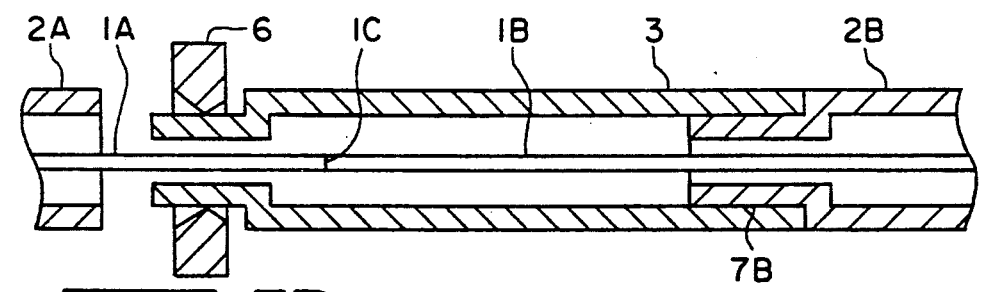

In FIG. 7D, another two-split die 6 is applied over a free end portion of the sleeve 3 to further reduce the outer diameter of the free end portion.

Figure 7E:
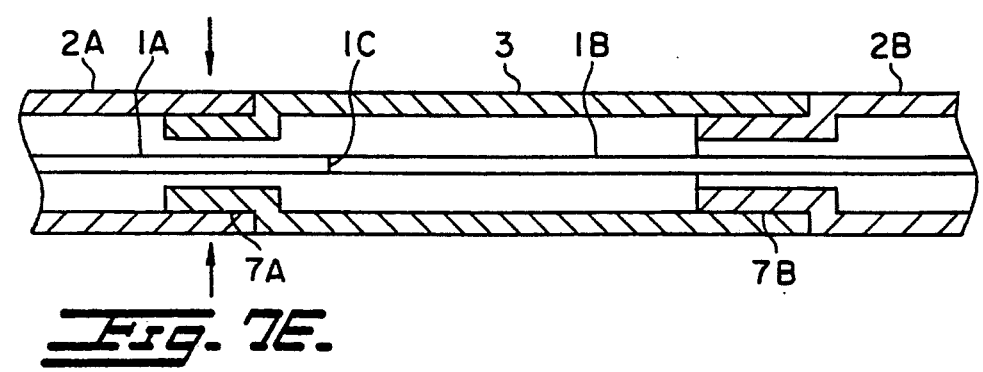

In FIG. 7E, the diameter-reduced free end portion of the sleeve 3 is inserted into a metal pipe 2A to provide an overlapped portion of the metal pipe 2A and the sleeve 3. Then, the overlapped portion is soldered or welded as indicated by arrows.

Consequently, a connection structure of the optical fibers 1A and 1B sealed in the metal pipes 2A and 2B having metal pipe-connected portions 7A and 7B is obtained.

In the first to sixth preferred embodiments, a two-split die may be replaced by a swaging machine, and metal pipes and a sleeve may be of a material selected from copper, aluminum, titanium, etc. in place of stainless steel. In addition, solder may be replaced by silver solder, and laser light beam soldering or welding and AC discharge soldering or welding may be replaced by arc soldering or welding, electron beam soldering or welding, etc. At any rate, it is necessary that an internal temperature is less than 250° C. to avoid the deterioration of a coating layer and a core of an optical fiber.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for connecting optical fibers positioned and sealed in metal pipes, comprising the steps of:
   providing portions of said optical fibers exposed from said metal pipes;
   connecting said portions of optical fibers exposed from said metal pipes to each other to provide connected optical fibers;
   providing a sleeve for connecting said pipes;
   positioning said sleeve at least partially over one of said metal pipes;
   connecting said sleeve to one of said metal pipes at one end of said sleeve;
   positioning said sleeve to a remaining one of said metal pipes coaxially therewith;
   reducing an outer diameter of said sleeve to elongate said sleeve by a predetermined length so that said sleeve is overlapped on said remaining one of said metal pipes at another end of said sleeve; and
   connecting said sleeve elongated by said predetermined length to said remaining one of said metal pipes at another end of said sleeve after said reducing step.

2. A method for connecting optical fibers according to claim 1, wherein:
   said step of providing said sleeve includes providing a sleeve having an inner diameter larger at least at said one end than an outer diameter of said metal pipes.

3. A method for connecting optical fibers according to claim 1, wherein:
   said step of providing said sleeve includes providing a sleeve having an inner diameter larger at said another end than an outer diameter of said metal pipes.

4. A method for connecting optical fibers according to claim 1, wherein:
   said step of providing said sleeve includes providing a sleeve having an outer diameter smaller at said another end than an inner diameter of said metal pipes and said step of positioning said sleeve to said remaining one of said metal pipes includes inserting said sleeve into said remaining one of said metal pipes.

5. A method for connecting optical fibers according to claim 1, wherein:
   said steps of connecting said sleeve to said one and said remaining one of said metal pipes each includes heating overlapped portions of said sleeve and a respective metal pipe in a predetermined time interval by use of heating means selected from a laser device, an AC discharge apparatus, and an electron beam apparatus.

6. A method for connecting optical fibers positioned and sealed in metal pipes, comprising the steps of:
   providing portions of said optical fibers exposed from said metal pipes;
   connecting said portions of said optical fibers exposed from said metal pipes to each other to provide connected optical fibers;
   providing a sleeve for connecting said metal pipes;
   positioning said sleeve to one of said metal pipes;
   connecting said sleeve to one of said metal pipes at one end of said sleeve, said sleeve having an inner diameter layer at said one end and another end than an outer diameter of said metal pipes and an inner diameter equal at a predetermined portion of said sleeve to an inner diameter of said metal pipes;
   positioning said sleeve partially over a remaining one of said metal pipes and coaxially therewith;
   reducing an outer diameter of said sleeve to elongate said sleeve by a predetermined length so that an inner diameter of said sleeve becomes equal to an inner diameter of said metal pipes excepting said one and another ends of said sleeve and said sleeve is overlapped at said another end thereof on said remaining one of said metal pipes; and
   connecting said sleeve elongated by said predetermined length to said remaining one of said metal pipes at said another end of said sleeve after said reducing step.

7. A method for connecting optical fibers positioned and sealed in metal pipes, comprising the steps of:
   providing portions of said optical fibers exposed from said metal pipes;
   connecting said portions of said optical fibers exposed from said metal pipes to each other to provide connected optical fibers;
   reducing an outer diameter of said metal pipes along predetermined lengths at connecting ends thereof facing each other, excepting an end portion of one of said metal pipes to obtain a non-reduced diameter end portion of one of said metal pipes and a reduced diameter end portion of another of said metal pipes;
   inserting said reduced diameter end portion of said another of said metal pipes into said non-reduced diameter end portion of said one of said metal pipes to provide two end portions overlapping each other; and
   connecting said metal pipes to each other at said overlapping end portions after said reducing and said inserting steps.

* * * * *